(12) United States Patent
Thofelt

(10) Patent No.: US 6,197,094 B1
(45) Date of Patent: Mar. 6, 2001

(54) DEVICE FOR IMPROVING THE QUALITY OF INDOOR AIR

(76) Inventor: Lars Thofelt, Blomstervägen 17, Frösön SE-832 47 (SE)

(*) Notice: Subject to any disclaimer, the term of this patent is extended or adjusted under 35 U.S.C. 154(b) by 0 days.

(21) Appl. No.: 09/308,459

(22) PCT Filed: Nov. 18, 1997

(86) PCT No.: PCT/SE97/01924

§ 371 Date: May 18, 1999

§ 102(e) Date: May 18, 1999

(87) PCT Pub. No.: WO98/22756

PCT Pub. Date: May 28, 1998

(30) Foreign Application Priority Data

Nov. 18, 1996 (SE) .................................................. 9604207

(51) Int. Cl.⁷ .................................................. B01D 47/14
(52) U.S. Cl. ........................ 95/211; 95/227; 95/230; 95/237; 96/242; 96/248; 96/290
(58) Field of Search ...................... 47/79; 95/210, 95/211, 227, 230, 237, 274; 96/108, 130, 134–142, 242, 248, 290

(56) References Cited

U.S. PATENT DOCUMENTS

| | | | |
|---|---|---|---|
| 4,153,435 | * 5/1979 | Fischer | 96/248 |
| 4,732,591 | * 3/1988 | Tujisawa et al. | 96/135 |
| 4,734,111 | * 3/1988 | Hoffmann et al. | 96/290 X |
| 5,089,036 | * 2/1992 | Hawes | 96/290 X |
| 5,107,621 | * 4/1992 | Deutschmann, Sr. | 47/79 |
| 5,228,235 | 7/1993 | Ishimoto | 47/60 |
| 5,232,676 | * 8/1993 | Wolff et al. | 95/210 X |
| 5,315,834 | 5/1994 | Garunts et al. | 62/78 |
| 5,397,382 | * 3/1995 | Anderson | 96/135 |
| 5,407,470 | * 4/1995 | Jutzi | 96/135 X |
| 5,509,946 | * 4/1996 | Chu | 95/211 X |
| 5,853,460 | * 12/1998 | Alcordo | 96/135 X |

FOREIGN PATENT DOCUMENTS

| | | |
|---|---|---|
| 3 1037 073 A1 | 8/1982 | (DE) . |
| 44 07 413 A1 | 12/1994 | (DE) . |
| 44 31 574 C1 | 2/1996 | (DE) . |
| 195 26 361 A1 | 1/1997 | (DE) . |
| 0 355 703 A2 | 2/1990 | (EP) . |
| 0 593 393 A1 | 4/1994 | (EP) . |
| 443 221 | 2/1986 | (SE) . |

* cited by examiner

Primary Examiner—Robert H. Spitzer
(74) Attorney, Agent, or Firm—Zarley, McKee, Thomte, Voorhees & Sease

(57) ABSTRACT

A device for improving the quality of indoor air comprising a casing (2) with an air inlet (3) and an air outlet (5), a member (7) arranged to cause air in a room, in which the casing is placed, to flow in through the inlet and inside the casing to the outlet and therefrom out into the room again, and leaf surfaces and water nozzles (9, 11) adapted to influence the quality of the air passing through the casing. The casing also contains leaf plants (9) and the member (7) is provided in order to cause the air to flow past the leaf surfaces of the plants in order to remove contaminations and particles from the air by absorption thereof by the leaves of the plants.

16 Claims, 2 Drawing Sheets

DEVICE FOR IMPROVING THE QUALITY OF INDOOR AIR

FIELD OF THE INVENTION AND PRIOR ART

The present invention relates to a device for improving the quality of indoor air, said device comprising a casing with an air inlet and an air outlet, a member arranged to cause air in a room, in which the casing is placed, to flow in through the inlet and inside the casing to the outlet and therefrom out into the room again, and means adapted to influence the quality of the air passing through the casing, and a method for improving the quality of indoor air.

The need for such devices has increased during later years as a consequence of that the air, especially in densely populated areas, show an increasing amount of gaseous and particle-like contaminations from the industry as well as from engine vehicles, construction material, clothes, persons (deodorants, perfumes) and other sources, said contaminations having led to different types of over-sensitivity and allergies as well as diseases in the breathing means. There are also other sources to these problems, and the ventilation may for example in many cases contribute with contaminations as a consequence of that moisture in ventilation systems may include bacteria and fungi, which may bring about allergies and other types of over-sensitivity. It should also be mentioned that the houses of today are very well insulated in order to save energy, which often leads to an insufficient ventilation, which together with moisty places may form dwelling sites for dust mites, the secretions of which contribute to deteriorations of the indoor air.

Devices similar to the device defined in the introduction have been arranged in constructions in order to solve these problems by way of simply arranging different types of filters as said means in the ventilation conduits of the constructions. These previously known devices are however only able to partly solve the above mentioned inconveniences.

SUMMARY OF THE INVENTION

The object of the present invention is to provide a device of the type mentioned in the introduction, the use of which enabling a considerable improvement of the quality of the air in a room while the above mentioned problems caused by different types of contaminations in indoor air being reduced to a great extent.

This object is achieved according to the invention by way of arranging leaf plants inside the casing of such a device and that said member is arranged to cause the air to flow past the leaf surfaces of the plants in order to remove contaminations and particles from the air by absorption thereof by means of the leaves of the plants.

It is within ventilation technique a quite novel step to locate a casing containing leaf plants in a room and to cause air to flow through the casing past the leaves of the plants and it has turned out to lead to astonishingly good results concerning the improvement of the quality of the air passing through the casing. Experiments have shown that different types of gaseous contaminations such as toluene, different types of hydrocarbons and formaldehyde are absorbed to a very great extent by means of the leaves of the plants, and an effective removal of particles with a size larger than 1 µm from the air is also achieved, which substantially reduces the irritations these particles cause on the human mucous membranes.

According to a preferred embodiment of the invention the air flow generating member is arranged downstream of the plants in the path of the air flow in order to suck air past them. It has been shown that such an arrangement of the air flow generating member is very advantageous due to that it causes an optimum distribution of the air so that the air is sucked past substantially all leaf surfaces for a good interaction therewith, and the particles prevailing in the air are not disintegrated by such a suction, which would lead to that they would be released in the air at the outlet, which has shown to be the case by blowing the air instead.

According to another preferred embodiment of the invention the device comprises at least one nozzle arranged to supply finely divided water to the inside of the casing upstream of the plants in the air flow. Thanks to the introduction of such finely divided water into the air flow a plurality of air quality improving effects are obtained. Firstly the air may be conditioned to a degree of moisture pleasant for the human mucous membrane, which is especially important in the winter when generally the indoor air is way too dry. The small water droplets are further able to wash out particles from the air, which are deposited on the leaves of the plants so that such particles to a great extent being removed from the air. The supply of water is in this way besides advantageous for the well-being of the plants and the bacteria system.

According to another preferred embodiment of the invention the device comprises a member arranged to detect the degree of moisture in the air leaving the outlet of the casing and a control unit arranged to control the supply of water by means of the nozzle depending on information concerning the degree of moisture from the detecting member in order to regulate the degree of moisture of the outlet air. It is by arranging such a detection member and such a control unit possible to all the time keep the degree of moisture in the air in the room in question on a desired level, which usually implies a relative humidity between 35–45%, which can be compared with the humidity of indoor air between 15–20%, which is often the case in the winter.

According to another preferred embodiment of the invention the casing is adapted to be arranged with the inlet at the upper end thereof and the outlet at the lower end thereof, which is advantageous due to that it enables a simple arrangement of plants in different layers or levels for an optimum improvement of the air, and the casing may according to a further development of this embodiment be adapted to be arranged in a room with the inlet in the ceiling section of the room and the outlet in the floor section of the room, which has turned out to be very advantageous while warm air comprising particles and contaminations rising towards the ceiling in this way will be sucked into the casing, which leads to an improvement of the quality therein, and that good quality air with a pleasant temperature thereafter will flow out in the floor section in order to thereafter be heated up and contaminated while rising towards the ceiling and thereafter being sucked into the casing again.

According to another preferred embodiment of the invention the air flow generating member is arranged outside the casing below a bottom thereof, which leads to a simplified covering of this member and to an easier achievement of electricity safety.

According to another preferred embodiment of the invention the device comprises at least one light source, which is arranged to provide the plants with light, said light source being arranged above the plants, and it is arranged outside the casing, which is also advantageous concerning electricity safety.

According to another preferred embodiment of the invention the walls of the casing are at least partly made of transparent material, which is advantageous for the well-being of the plants, and it may also have aesthetical values due to that the plants may be seen from outside.

According to another preferred embodiment of the invention the casing contains plants, which are not flowering and which are concentrated on active growth, which is an important characteristic due to that pollen as well as fragrances and similar secretions from flowering are a potential allergic risk, which means that the device in such a case in this regard would deteriorate the air.

According to another preferred embodiment of the invention, the device therefor comprising means for restraining that the plants being illuminated more than 17 hours/day aiming at restraining flowering.

According to another preferred embodiment of the invention the casing contains plants with a large leaf surface, which naturally increases the possibility to interaction with the air and absorption of contaminations and particles therefrom.

According to another preferred embodiment of the invention the casing contains plants in porous containers, which is advantageous while a certain gas exchange may occur through the walls of the container leading to an air quality improvement due to that active bacteria in this way can take care of the contaminations in the air.

According to another preferred embodiment of the invention the plants are planted in active soil and it has turned out that such soil also strongly contributes to absorption and disintegration of contaminations and specifically certain bacteria systems which after a while are adapted to the air. It is therefor advantageous to expose as much soil surface as possible.

According to another preferred embodiment of the invention the air flow generating member is arranged to achieve a flow of air through the casing, which is 40–80 times the volume of the casing/hour. It has turned out that such a circulation to this extent of the air leads to an optimum using of "the living filter" that the device forms.

The invention also relates to a method for improving the quality of indoor air, in which air is caused to flow past means, which are adapted to influence the quality of the air and in which the air is caused to flow past leaf surfaces of leaf plants in order to remove contaminations and particles from the air by absorption thereof by means of the leaves of the plants. The advantages with such a method are without any doubt clear from the discussion above of the device according to the invention.

Further advantages as well as advantageous characteristics of the invention will be apparent in the following description and other dependant claims.

BRIEF DESCRIPTION OF THE DRAWINGS

With reference to the appended drawings, below follows a description of preferred embodiments of the invention suited as examples. In the drawings.

DETAILED DESCRIPTION OF PREFERRED EMBODIMENTS OF THE INVENTION

Figure 1:
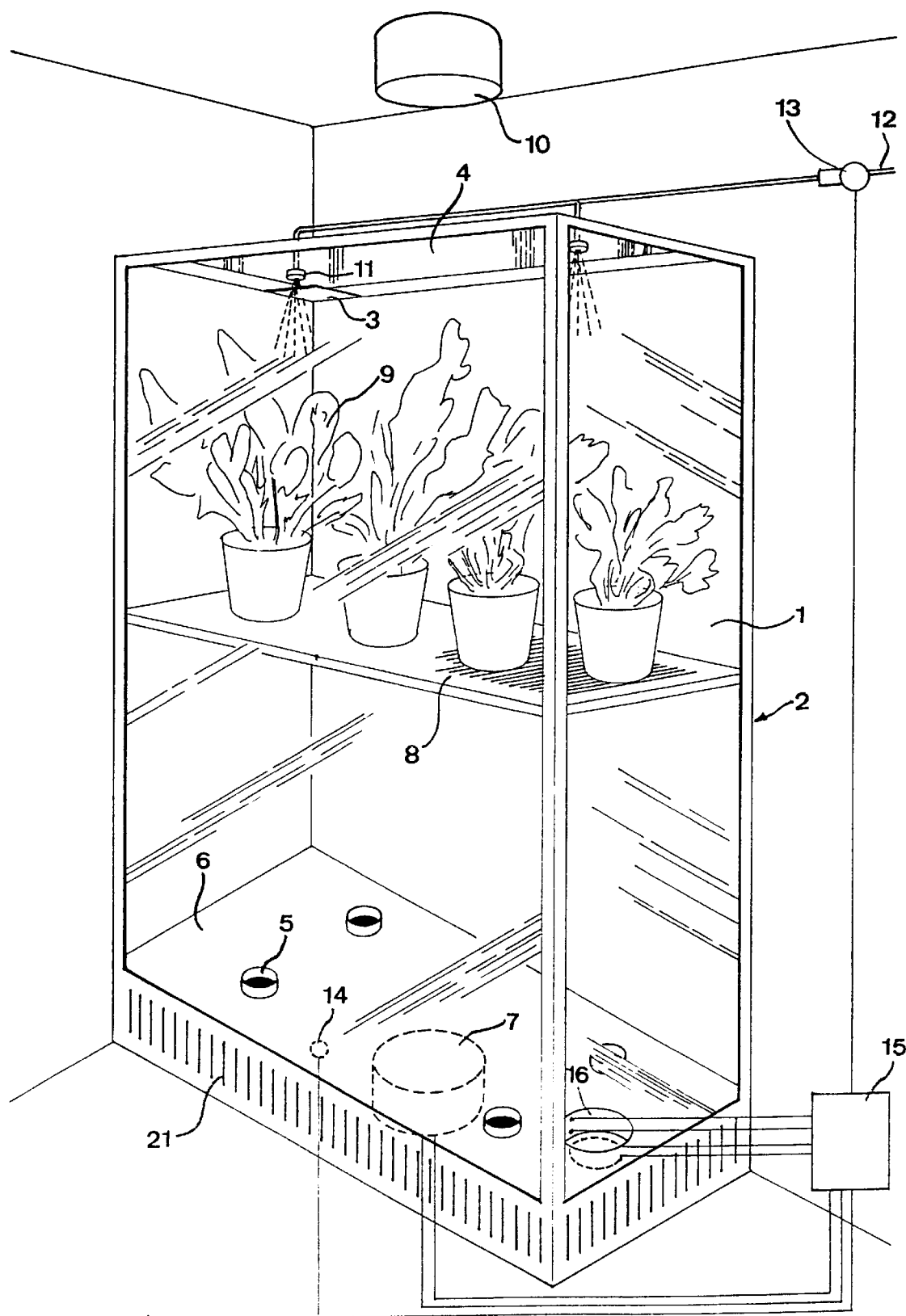
FIG. 1 is a schematic, perspective view illustrating a device according to a preferred embodiment of the invention.

FIG. 1 illustrates a device for improving of the quality of indoor air according to a preferred embodiment of the invention, and this device comprises a casing 2 defining an inner room 1, said casing having a box-like form and being provided with an air inlet 3 at an upper part thereof, said inlet being formed by slots in the ceiling 4 thereof, although said air inlet just as well may have another form, and provided with air outlets 5 at the lower end thereof in the form of sockets 5 in the bottom of the casing, said sockets should be provided with caps in order to avoid dripping out of the casing. The device has further a member 7 or more exactly a fan, which is arranged to cause air to flow in through the inlet 3 and inside the inner room 1 of the casing and out of the casing through the outlets 5 by means of that the suction side of the member being directed towards the bottom 6 and the sockets 5. The casing is adapted to be arranged in a room with the inlet in the ceiling section of the room and the outlet in the floor section of the room, and it has for this purpose typically a height between 2,1 and 2,5 m while the width thereof advantageously being 1,5 m and the depth thereof about 0,6 m.

Leaf plants 9 are arranged on shelves 8 inside the casing, preferably in pots of porous material and in active soil present in these pots, the leaf plants being arranged so that they cover substantially the whole cross-section of the casing in the horizontal plane so that the air flowing through the casing will pass the leaves of the plants and the soil in a close relation thereto. With active soil is hereby referred to soil with a large amount of micro-organisms, and the bacteria of the soil absorb and decompose contaminations and particles. The shelves are either small so that they are arranged with a certain spacing or perforated so that the air can comfortably flow through the casing from the inlet to the outlet. Such shelves with leaf plants are preferably arranged on a plurality of levels in the casing in order to obtain a maximum interaction between the leaves of the plants and the air. Only one shelf and a few plants are shown in FIG. 1 for simplifying purposes, but a real application could be quite different. The plants and the shelves are arranged so that the air is caused to travel along as long path as possible inside the casing in order to achieve maximum cleaning. The plants are preferably tropical plants with green leaves, which show a large leaf surface and are active, i.e. they are able to absorb substances from the air and they are comfortable in a moisty environment (this will be explained below). Different types of grass such as papyrus, could also be useful, and leaves are hereby and in the claims defined as comprising for example grass straws and other green, active parts.

The walls of the casing are preferably formed by glass so that the plants will achieve light from outside, but also in order to provide the casing with an aesthetic attractive design with the visible plants arranged in the casing. The frames for walls, bottom and roof are made of metal such as for example aluminium. A light source 10 is arranged above the roof 4, which is also made of transmittable material such as glass in order to provide the plants with a necessary illumination for their well-being. The lamp should supply so-called daylight (ca. 5,400 K). The requirements for electricity safety can without any problems be fulfilled due to that the light source 10 is arranged outside the casing itself. This is also the case at the bottom 6 of the casing where the fan 7 is arranged below said bottom.

The device has further two nozzles 11 arranged in the ceiling 4 of the casing, which are connected to a water conduit 12 via a solenoid valve 13 coupled in between them. The nozzles are arranged for spraying finely divided water down into the inner room 1 of the casing in the air flow sucked in through the inlet 3 in order to: 1) remove particles from the air so that they deposit on the leaves of the plants and soil and will be absorbed and disintegrated by the bacteria system on leaves as well as in soil, 2) keep the plants fresh, 3) condition the air to a degree of moisture pleasant for the human mucous membranes, preferably to a humidity of 35–45%, 4) reduce the temperature to a pleasant level.

The device has also a detecting member 14 arranged in the proximity of the fan 7 in order to detect the degree of moisture in the air leaving the outlets 5 of the casing, said detecting member 14 being arranged to send information concerning the degree of moisture to a control unit 15, which in turn is arranged to depending on this information from the detecting member 14 control the solenoid valve 13 and thereby the supply of water for regulation of the humidity in the outlet air so that the detecting member 14 can see to that the humidity of the air leaving the casing always being on a desired level. If the humidity becomes too high, it would namely lead to condensation problems in the room in question.

Figure 2:
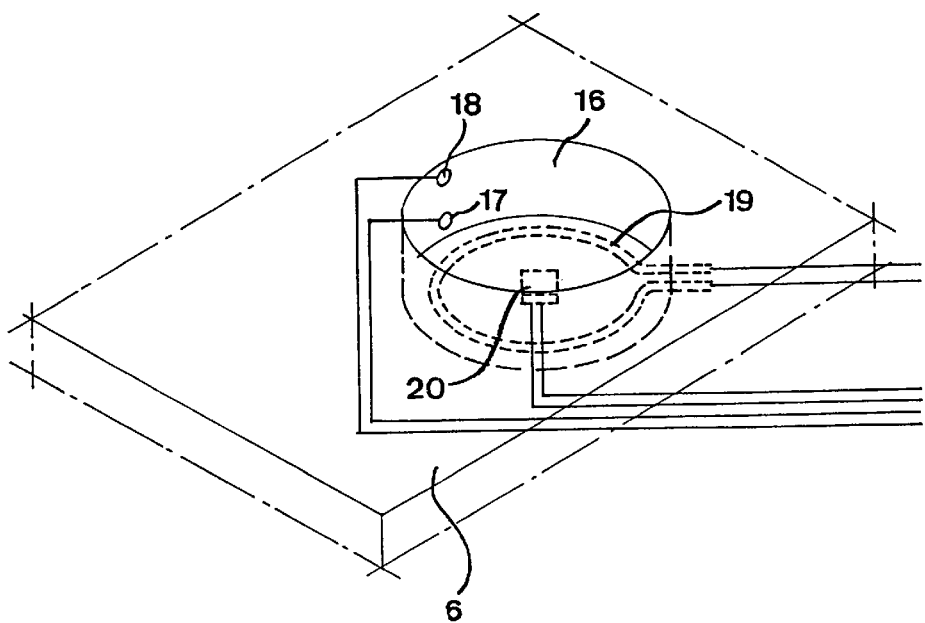
FIG. 2 is an enlarged view of a part of the lower part of the device according to FIG. 1.

It is FIG. 2 shown that the bottom of the casing is provided with a water-collecting container 16, a so-called lowest point, and it is arranged to counteract a flood. Two electrodes 17, 18 are arranged above each other in this container at the upper part of the container. When the water rises in the container it will first reach the first electrode and then the second electrode, which leads to that an electric circuit is being closed. This circuit leads to the control unit 15, which as a consequence of the closing of the circuit closes the solenoid valve, i.e. interrupt the water supply to the casing via the nozzles. A heating coil 19 in the bottom of the container 16 is at the same time started so that the water in the container evaporates until the temperature rises to 105° C. or similar. The device has a temperature sensor 20 in the container, said sensor sensing this temperature and it interrupts the heating coil 19 and sends an order to the control unit to open the solenoid valve when such a predetermined temperature is obtained.

The operation of the device according to the invention should be clear from the discussion above, but it may be summarized in the following way. Air containing contaminations and particles is sucked in through the inlet 3 of the casing by way of the operation of the fan in the ceiling section of the room, (said fan having a low number of revolutions in order to avoid noise), and the air is moisturized by means of the nozzles 11 on its' way down and past the leaves of the leaf plants 9. The air will interact with the leaves while passing them and the leaves will absorb different types of contaminations in the air, such as toluene, hydrocarbons, formaldehyde, and similar substances, while at the same time particles with a size larger than 1 $\mu$m present in the air being effectively washed out by means of the finely divided water from the nozzles, said water preferably being droplets with a diameter size of approximately 100 $\mu$m. The cleaned and conditioned air is sucked out of the casing through the outlet sockets by means of the fan 7 and is caused to well out in the room in the floor section of the room through side grids 21 of the device due to so-called deplacement. The cleaned and conditioned air will thereafter rise from the floor section of the room while it is heated up and contaminated again, and it is thereafter sucked in through the inlet of the casing. The air flow generating member 7 is preferably arranged to provide a flow of air through the casing, which is 40–80 times the volume of the casing/hour.

Figure 3:
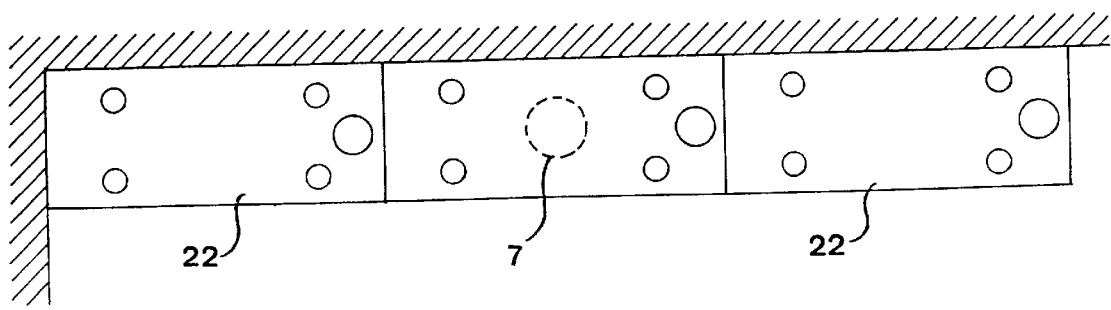
FIG. 3 is a view from below illustrating three device modules mounted side by side according to another preferred embodiment of the invention.

It is in FIG. 3 illustrated how three devices according to the invention may be arranged side by side along a wall and it is thereby possible that both outer side modules 22 are not having any fan 7, but instead having the fan 7 in common with the module in the middle even if all three modules of course could be provided with a fan of their own. The different modules may have one lamp each or partly lamps in common.

The invention is of course not in any way limited to the above described embodiment, but a plurality of possibilities to modifications thereof should be apparent for a man skilled in the art without thereby departing from the scope of the invention and the invention idea.

It is for example possible to arrange a receptacle with water by the casing, for example above the casing and connect it to the nozzles 11 instead of connecting the nozzles to the water supply net. A low price alternative of the invention is also possible by instead manually water the inner room of the casing with more or less even intervals.

The walls of the casing are preferably made of glass in the case that the casing is arranged on its' own, while the back of the casing, i.e. the wall arranged towards the wall of the room preferably being a mirror in order to improve the looks of the casing.

The bottom of the casing may also be a mirror in order to obtain reflection of the light from the light source towards the plants.

The word "nozzle" is in the claims to be given a very wide meaning and it comprises all possible members for generating finely divided water particles.

The cover against flooding could as an alternative to what is shown in the figures and described in the description may be realized by means of a bowl provided in the bottom of the casing, said bowl being relatively shallow but very wide, said bowl could be provided with a sensor on a distance from its' lowest part, said sensor would when being wet interrupt the water supply to the nozzles, i.e. close the solenoid valve in the present case and thereafter connect the water supply again when it has become dry again. The water in the bowl would after an interruption evaporate through the passing air and a heating coil would not be necessary, which leads to that only the lamp would need net voltage.

What is claimed is:

1. A device for improving the quality of indoor air, said device comprising a casing (2) with an air inlet (3) and an air outlet (5), a member (7) arranged to cause air in a room, in which the casing is placed, to flow in throught the inlet and inside the casing to the outlet and therefrom out into the room again, and means (9,11) adapted to influence the quality of the air passing through the casing, said casing contaning leaf plants (9) and said member (7) being arranged to cause the air to flow post the leaf surfaces of the plants in order to remove contaminations and particles from the air by absorption thereof by means of the leafs of the plants, said member (7) generating an air flow being arranged down stream of the plants (9) in the path ot the air flow in order to suck air past them, characterized in that the air flow generating member (7) is arranged to achieve a flow of air through the casing which is 40–80 times the volume of the casing/hour, that the device comprises at least one nozzle (11) arranged to supply finely divided water to the inside of the casing up stream of the plants (9) in the air flow, that it comprises a control unit (15) adapted to control the supply of water through the nozzle for regulating the humidity of the air leaving the casing that the device is adapted to condition the air to a degree of moisture pleasant for human mucous membranes, which means the relative humidity of 35–45%, and that the device is adapted to reduce the temperature of the air drawn from the room into the casing to a pleasant level.

2. A device according to claim 1, characterized in that it comprises a member (14) arranged to detect the degree of moisture in the air leaving the outlet (5) of the casing (2), and further providing that the control unit (15) controls the supply of water by means of the nozzle (11) depending on information concerning the degree of moisture from the detecting member in order to regulate the degree of moisture of the outlet air.

3. A device according to claim 1, characterized in that a bottom (6) of the casing (2) is provided with a water collecting container (16) dud that members (17,18) are arranged to detect the water level in the container and to control an apparatus (19) to remove water from the container and thereby from the casing when a predetermined water level is obtained in the container.

4. A device according to claim 1, characterized in that the casing (2) is adapted to be arranged with the inlet (3) at the upper end thereof and the outlet (5) at the lower end thereof.

5. A device according to claim 4, characterized in that the casing (2) is adapted to be arranged in a room with the inlet in the ceiling section of the room and the outlet in the floor section of the room.

6. A device according to claim 4, characterized in that the air flow generating member (7) is arranged outside the casing (2) below a bottom (6) thereof.

7. A device according to claim 1, characterized in that it comprises at least one light source (10), which is arranged to provide the plant (9) with light and that the light source is arranged above the plants.

8. A device according to claim 7, characterized in that the light source (10) is arranged outside the casing (2).

9. A device according to claim 1, characterized in that it comprises means for restraining that the plants being illuminated more than 17 hours/day.

10. A device according to claim 1, characterized in that the walls of the casing are at least partly made of transparent material.

11. A device according to claim 1, characterized in that the plants (9) are not flowering and which are concentrated on active growth.

12. A device according to claim 1, characterized in that the plants (9) have a large leaf surface.

13. A device according to claim 1, characterized in that the plants (9) are in porous containers.

14. A device according to claim 1, characterized in that the plants are planted in active soil.

15. A device according to claim 1, characterized in that the plants (9) are arranged on different levels in the casing between the inlet and the outlet.

16. A method for improving the quality of indoor air comprising: causing air to flow through the device of claim 1.

* * * * *